United States Patent [19]

Josien et al.

[11] 4,436,120

[45] Mar. 13, 1984

[54] INFLATABLE INTERNAL PIPE OBTURATOR WITH HARDENABLE CORE

[75] Inventors: Daniel Josien, Willems; Jean-Louis Migliarese, Paris, both of France

[73] Assignee: Compagnie Francaise Des Petroles, Paris, France

[21] Appl. No.: 388,772

[22] Filed: Jun. 15, 1982

[30] Foreign Application Priority Data

Jun. 23, 1981 [FR] France ............... 81 12265

[51] Int. Cl.³ .............................. F16L 55/10
[52] U.S. Cl. ..................................... 138/93
[58] Field of Search ..................... 138/89, 93

[56] References Cited

U.S. PATENT DOCUMENTS

| 2,474,047 | 6/1949 | Gorzkowski | 138/93 |
| 3,190,679 | 6/1965 | Lester | 138/93 |
| 3,338,499 | 8/1967 | Gilbert | 138/89 |
| 3,340,336 | 9/1967 | Bender | 138/89 |
| 3,473,572 | 10/1969 | Nielson et al. | 15/104.06 R |
| 3,805,844 | 4/1974 | Bacon | 138/93 |
| 4,245,970 | 1/1981 | St. Onge | 138/93 |

FOREIGN PATENT DOCUMENTS

| 138437 | 10/1979 | Fed. Rep. of Germany | 138/89 |
| 672394 | 7/1979 | U.S.S.R. | 138/93 |

*Primary Examiner*—John W. Shepperd
*Attorney, Agent, or Firm*—Sughrue, Mion, Zinn, Macpeak and Seas

[57] ABSTRACT

The invention relates to an internal obturator for a pipe, particularly for a hydrocarbon conveying pipe-line, which comprises a central core and a flexible inflatable sleeve surrounding the core, wherein the central core comprises a flexible casing filled with a hardenable material which is hardened after its introduction into the flexible casing. The hardenable material may be hardened before or after insertion of the obturator into a pipe.

5 Claims, 1 Drawing Figure

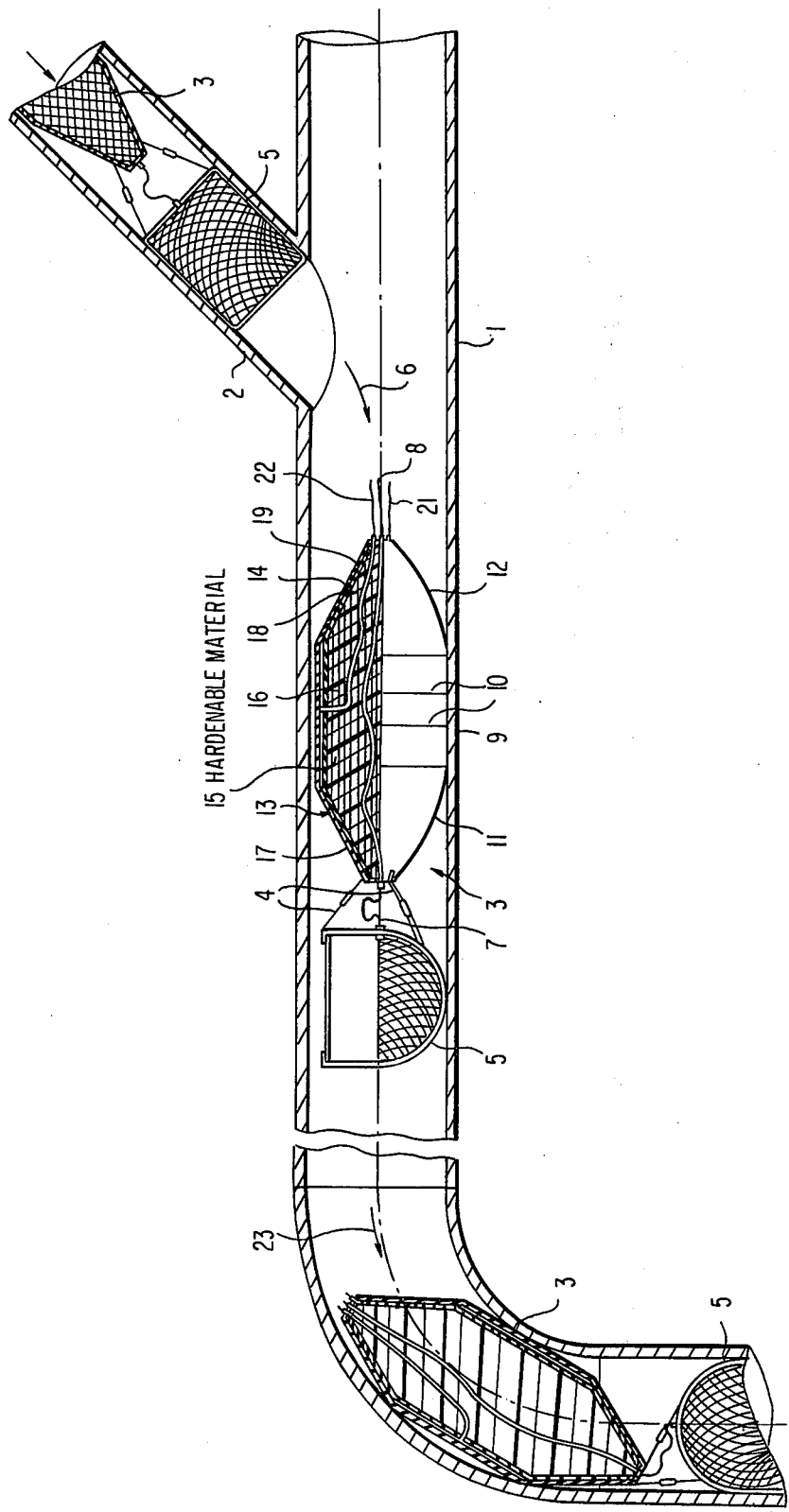

INFLATABLE INTERNAL PIPE OBTURATOR WITH HARDENABLE CORE

The invention relates to improvements in obturators adapted to be disposed inside a pipe to isolate from one another the two internal spaces in the pipe situated one on each side of the obturator. The invention is particularly, but not exclusively, applicable to the repair of a submerged hydrocarbon conveying pipeline, in which it is desired to isolate a section during the repair.

It has already been proposed to construct an obturator of this kind comprising a rigid metal core surrounded by a flexible, inflatable sleeve which, in its inflated state, ensures leaktightness in relation to the pipe in which the obturator is placed and which, in its deflated state, leaves a clearance between the obturator and the inside wall of the pipe, so that when the flexible sleeve is in its deflated state the obturator can be displaced inside the pipe to enable it to be brought to the desired position and subsequently to be brought out of the pipe.

However, the difference between the dimensions of the obturator in the inflated state and in the deflated state of the flexible sleeve is slight and constitutes a hindrance during the introduction of the obturator into the pipe, either through one end of the pipe or, in particular, in the actual intervention zone by the techniques known as hot tapping and cold tapping.

Furthermore, the presence of a metal core in a pipe may sometimes lead to jamming which it is difficult to overcome.

According to the invention there is provided an internal obturator for a pipe comprising a central core and a flexible sleeve disposed around the core, wherein said central core comprises a flexible casing filled with a hardenable material which is hardened after its introduction into the flexible casing.

Preferably the core is destructible by a solvent.

An obturator as described above may be introduced into the pipe before having the hardenable material inserted into the flexible casing, or at least before the hardenable material has had time to harden in the casing or before a cross-linking agent has been added to it, in order to facilitate the introduction of the obturator into the pipe because the obturator may then initially be entirely flexible. After hardening of the central core it is then possible for the obturator to apply its full obturating action. Even if it is not desired to make use of the above described preferred feature which eases introduction of the obturator into the pipe, and if the central core were hardened before the obturator is inserted into the pipe, the obturator would still be retained, namely by the fact that the obturator may be adapted so that it can easily be destroyed in the event of jamming in the pipe. The obturator is advantageously made of rubber and/or a synthetic resin, which are materials which are easily dissolved by substances such as toluene and basic solutions respectively.

The central core preferably comprises a cylindrical portion, and the flexible sleeve is preferably disposed around this cylindrical portion and is covered radially outwardly by a cylindrical sealing wall retained at at least one of its longitudinal ends.

The central core may comprise a median cylindrical portion with tapered terminal portions at the longitudinal ends of the cylindrical portion. The sealing wall may form part of a cover enclosing the entire core, so that the sealing wall is retained on the core against any longitudinal entrainment force (crawling) because of the self-wedging brought about by the shape of the core and of the sealing wall.

The cover may be made of a material which is not subject to longitudinal elongation; this can be achieved in particular with certain polyester or polyamide fibres, a material available commercially under the name KEVLAR, or materials of the wound filament type (for example glass cloth or metal cable).

An embodiment according to the invention will now be described by way of example only, with reference to the accompanying drawing, which the single FIGURE shows in longitudinal section a pipe with the obturator in three successive phases: during insertion of the obturator, during obturation, and during withdrawal of the obturator.

As shown in the drawing, to pipe 1, an auxiliary pipe 2 of smaller diameter has been connected for the insertion of an obturator. The auxiliary pipe 2, which is installed towards one end of the pipe 1 or near a zone requiring repair in the pipe 1, is constructed in a known manner which it does not appear necessary to set down here. The obturator 3 is connected by straps 4 to an auxiliary obturator or towing scraper 5, although such auxiliary towing means is not always necessary. The assembly comprising the auxiliary towing obturator 5 and the main obturator 3 enters the pipe 1 from the auxiliary pipe 2 and is moved in the pipe 1 through the action of a fluid (gas or liquid) pressure applied to the obturator 5 in the direction of the arrow 6, in order to be brought to the position where obturation is desired, this position being shown in the centre of the FIGURE.

In this position, the top half and the bottom half of each of the obturators 3 and 5 are shown differently. The bottom half of the obturator 5 has been shown as it presents itself in the pipe 1, while the top half of the obturator 5 has been shown as it was when the obturator 5 was still in the pipe 2. The obturator 5 is an inflatable obturator receiving an inflating fluid through an umbilical cord 7, which passes through the obturator 3 and is connected by its upstream portion 8 to a source of compressed fluid (not shown).

The bottom half of the obturator 3 is shown with its flexible sleeve in the inflated state, and in side view, making it possible to see the cover forming the sealing wall and comprising a median cylinder 9 where the sealing wall is provided with sealing O-rings 10, and two terminal portions 11 and 12. The cover is designated 19 in the top half of the obturator 3. This top half is shown in axial section and with the flexible sleeve in the uninflated state, and shows the core 13 comprising a casing 14 filled with a hardenable resin 15, such as an epoxy resin for example. This resin is hardened in the obturation phase shown in the centre of the FIGURE, whereas it was not yet hardened in the insertion phase shown on the right of the FIGURE, during which insertion phase the obturator 3 still had all its original flexibility. The core 13 has a shape comprising a median cylinder 16 and tapered end portions 17, 18 corresponding respectively to the portions 9, 11 and 12 of the cover 19. The cover 19, which is of KEVLAR fabric coated with NEOPRENE surrounds the casing 14. The cover 19 may, for example, be produced around an inflatable mould, leaving an opening at one longitudinal end of the cover, after which the mould is deflated and withdrawn through this opening. The opening is then used for insertion into the cover 19 of the casing 14 together with a flexible sleeve 20, which is inserted between the casing 14 and the cover 19, in the cylindrical portion 9, 16. The opening was then either closed or left open. The casing 14 is filled through an umbilical cord 21, while the inflation of the flexible sleeve 20 with a compressed fluid or with a resin which dries without shrinkage or even, if possible, expands on drying, is effected through an umbilical cord 22. For reasons of safety, the flexible sleeve 20 preferably comprises two bladders arranged side by side in the longitudinal direction and fed separately by different umbilical cords. In the drawing only one bladder has been shown in order to simplify the illustration. The tubular inlet connections for the umbilical cords 7, 21, 22 respectively leading into the obturator 5, the casing 14, and the flexible sleeve 20 are not shown, being of conventional type. In addition, a non-return valve (not shown) may be associated with at least some of the tubular inlet connections.

When obturation is to be terminated, two cases may arise. If the flexible sleeve 20 was inflated with a compressed fluid and if the umbilical cord 22 still exists, the sleeve 20 is deflated, after which the assembly comprising the obturators 5 and 3 can be displaced in the direction of the arrow 23 by applying a higher pressure in the right-hand part of the pipe 1. On the left of the FIGURE this assembly can be seen in the course of its displacement. If the flexible sleeve 20 was inflated with a resin, or if there is no longer an umbilical cord connection (as in the case of cold tapping, for example), an adequate higher pressure is applied in the pipe 1 to drive the obturator 3 to the left of the FIGURE; the cylindrical part 9 of the cover 19 wears through the action of its heating; the same is true of the flexible sleeve 20 and the obturator 3 can pass into the bends of the pipe 1. If necessary, a solvent or a basic solution which dissolves the obturator can be introduced into the pipe by applying a thrust by means of a piston of a fluid.

Numerous modified embodiments of the obturator 3 and modifications of the method of its displacement in the pipe 1 can obviously be adopted without departing from the scope of the invention.

There is thus provided an obturator which can have reduced dimensions during its introduction into the pipe, and in which all substantial metal parts capable of causing jamming in the pipe have been eliminated.

What is claimed is:

1. A displaceable internal obturator for a pipe, comprising:
   (a) a central core (13) including a cylindrical portion (16), said core comprising a flexible envelope (14) filled with a hardenable material,
   (b) a flexible inflatable sleeve (20) disposed around the cylindrical portion of said core,
   (c) a flexible outer cylindrical sealing wall (9) disposed around said sleeve and retained in place at at least one longitudinal extremity thereof,
   (d) a first flexible umbilical cord (21) connected to said flexible envelope for introducing a fluid material into said envelope, and
   (e) a second flexible umbilical cord (22) connected to said sleeve for inflating said sleeve with a pressurized fluid, whereby the obturator may be introduced into a pipe and displaced therealong to a desired position, whereafter the core filler material is hardened and the sleeve is inflated to urge the outer cylindrical wall into sealing engagement with the pipe inner wall to obturate said pipe.

2. An obturator according to claim 1, wherein said flexible envelope and said hardenable material therein are made of material selected from the group consisting of rubber and synthetic resins which are easily dissolved by a solvent.

3. An obturator according to claim 1, wherein said sealing wall is made of a material which is relatively highly resistant to longitudinal elongation.

4. An obturator according to claim 1, wherein said sealing wall forms part of a cover enclosing said core.

5. An obturator according to either claim 1 or claim 2, in which said cylindrical portion of said central core comprises a median portion and tapered terminal portions at the longitudinal ends of said median portion.

* * * * *